US011974121B2

(12) United States Patent
Sharma et al.

(10) Patent No.: US 11,974,121 B2
(45) Date of Patent: *Apr. 30, 2024

(54) METHODS AND APPARATUS FOR SUPPORTING INTEGRITY PROTECTION IN HANDOVERS

(71) Applicant: Sony Group Corporation, Tokyo (JP)

(72) Inventors: Vivek Sharma, Basingstoke (GB); Hideji Wakabayashi, Basingstoke (GB); Shinichiro Tsuda, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/882,635

(22) Filed: Aug. 8, 2022

(65) Prior Publication Data
US 2022/0386115 A1    Dec. 1, 2022

Related U.S. Application Data

(63) Continuation of application No. 16/625,748, filed as application No. PCT/EP2018/070886 on Aug. 1, 2018, now Pat. No. 11,457,352.

(30) Foreign Application Priority Data

Aug. 2, 2017  (EP) .................................... 17184591

(51) Int. Cl.
*H04W 12/04* (2021.01)
*H04W 12/10* (2021.01)
*H04W 36/00* (2009.01)

(52) U.S. Cl.
CPC ........... *H04W 12/04* (2013.01); *H04W 12/10* (2013.01); *H04W 36/0038* (2013.01)

(58) Field of Classification Search
CPC ... H04W 12/04; H04W 12/10; H04W 12/108; H04W 12/106; H04W 36/0038
See application file for complete search history.

(56) References Cited

U.S. PATENT DOCUMENTS 11,457,352 B2 *   9/2022   Sharma ............. H04W 36/0038
2010/0002883 A1   1/2010   Sammour et al.
(Continued)

OTHER PUBLICATIONS

Ericsson (Ericsson, "New KI—Supporting integrity protection of UP", 3GPP TSG-SA WG Meeting #86 S3-170231, Sophia Antipolis, France Feb. 6-10, 2017). (Year: 2017).*
(Continued)

*Primary Examiner* — Umair Ahsan
(74) *Attorney, Agent, or Firm* — XSENSUS LLP

(57) ABSTRACT

A method comprising receiving a handover request message indicating a request for handover of a wireless communications device from a source infrastructure equipment to a target infrastructure equipment, receiving an indication from the source infrastructure equipment as to whether or not user plane data is being transmitted to or received from the wireless access network via the source infrastructure equipment using an integrity protection scheme, determining whether or not the integrity protection scheme for the user plane data is supported by the target infrastructure equipment, transmitting a handover command to the source infrastructure equipment to indicate to the source infrastructure equipment that the source infrastructure equipment should handover the wireless communications device to indicate to the source infrastructure equipment, and providing an indication as to whether or not the integrity protection scheme can be used for transmitting or receiving user plane data via the target infrastructure equipment.

13 Claims, 7 Drawing Sheets

(56) References Cited

U.S. PATENT DOCUMENTS

2019/0191348 A1    6/2019  Futaki et al.
2019/0394651 A1*  12/2019  Wifvesson .......... H04W 12/106
2020/0100101 A1    3/2020  Torvinen et al.

OTHER PUBLICATIONS

International Search Report and Written Opinion dated Sep. 26, 2018 for PCT/EP2018/070886 Aug. 1, 2018, 13 pages.
3GPP, "5G; NR; Overall description; Stage-2," 3GPP TS 38.300 version 15.3.1 Release 15, ETSI TS 138 300 V15.3.1, Oct. 2018, 90 pages.
3GPP, "LTE; Evolved Universal Terrestrial radio Access (E-UTRA); Radio Resource Control (RRC); Protocol specification," 3GPP TS 36.331 version 13.0.0 Release 13, ETSI TS 136 331 V13.0.0, Jan. 2016, 670 pages.
3GPP, "Confidentiality Algorithms," Retrieved from Internet URL: https://www.3gpp.org/specifications/60-confidentialityalgorithms, 2 pages.
Ericsson, "New KI -Supporting integrity protection of UP," 3GPP TSG-SA WG3 Meeting No. 86, S3-170231, Sophi, Antipolis, France, Feb. 6-10, 2017, 2 pages.
Holma, H., and Toskala, A., "LTE for UMTS: OFDMA and SC-FDMA Based Radio Access," System Architecture Based on 3GPP SAE, John Wiley & Sons, Apr. 1, 2009, ISBN 9780470994016, 11 pages.
Nokia: "Interim agreements for Key issue #4.17", 3GPP Draft; S3-171818 PCR to 33.899, Jul. 31, 2017, XP051312300.

* cited by examiner

As a first option, the new IE is included inside e.g. securityconfigHO IE.

```
RRCConnectionReconfiguration-r8-IEs ::= SEQUENCE {
    measConfig              MeasConfig              OPTIONAL,   -- Need ON
    mobilityControlInfo     MobilityControlInfo     OPTIONAL,   -- Cond HO
    dedicatedInfoNASList    SEQUENCE (SIZE(1..maxDRB)) OF
                                DedicatedInfoNAS    OPTIONAL,   -- Cond
    nonHO
        radioResourceConfigDedicated    RadioResourceConfigDedicated    OPTIONAL,   -- Cond HO-
    toEUTRA
        securityConfigHO        SecurityConfigHO        OPTIONAL,   -- Cond HO~  400
    nonCriticalExtension    RRCConnectionReconfiguration-v890-IEs   OPTIONAL
}
```

FIG. 4

Example of new IE:

```
SecurityConfigHO ::=        SEQUENCE {
    handoverType                CHOICE {
        intraNR##                   SEQUENCE {
            securityAlgorithmConfig     SecurityAlgorithmConfig     OPTIONAL,   -- Cond fullConfig
            keyChangeIndicator          BOOLEAN,
            nextHopChainingCount        NextHopChainingCount,
            IntegrityCheckUserData      BOOLEAN
        },
        interRAT                    SEQUENCE {
            securityAlgorithmConfig     SecurityAlgorithmConfig,
            nas-SecurityParamToEUTRA    OCTET STRING (SIZE(6))
        }
    },
    ...
}
```
⟵ 500

FIG. 5

Alternative example is to include new IE inside security algorithm configuration:

```
-- ASN1START

SecurityAlgorithmConfig ::=    SEQUENCE {
    cipheringAlgorithm             CipheringAlgorithm-r12,
    integrityProtAlgorithm         ENUMERATED {
                                       eia0-v920, eia1, eia2, eia3-v1130, spare4, spare3,
                                       spare2, spare1, ...},
    UserPlaneIntegrityProtAlgorithm ENUMERATED {
                                       eia0-v920, eia1, eia2, eia3-v1130, spare4, spare3,
                                       spare2, spare1, ...}
}

CipheringAlgorithm-r12 ::=    ENUMERATED {
                                  eea0, eea1, eea2, eea3-v1130, spare4, spare3,
                                  spare2, spare1, ...}

-- ASN1STOP
```
⎯ 600

FIG. 6

METHODS AND APPARATUS FOR SUPPORTING INTEGRITY PROTECTION IN HANDOVERS

CROSS-REFERENCE TO RELATED APPLICATIONS

The present application is a continuation of U.S. application Ser. No. 16/625,748, filed Dec. 22, 2019, which is based on PCT filing PCT/EP2018/070886, filed Aug. 1, 2018, which claims priority to EP 17184591.0, filed Aug. 2, 2017, the entire contents of each are incorporated herein by reference.

BACKGROUND

Field of Disclosure

The present disclosure relates to wireless communications devices and infrastructure equipment configured to provide integrity protection of data communicated via a mobile communications network, and methods therefor.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present technique.

Fourth generation mobile communication networks are able to support sophisticated services that demand high bandwidth and low latency data transmission. Efforts are now being targeted at a new technology that will further increase the range of services that can be delivered to wireless communication devices. It is expected that this new technology will be based on a new core network architecture.

Protecting the integrity of data being transmitted in a mobile communications network has been an area of technical development since the second generation networks were deployed. This includes protection against malicious attack in which signalling information is corrupted or falsely generated to disrupt the operation of a mobile communications network as well as ensuring the integrity of communicated user data. Now in fifth generation technology a technical problem exists in improving integrity protection generally.

SUMMARY OF THE DISCLOSURE

According to one example embodiment of the present technique, there is provided a method performed in an infrastructure equipment acting as a target for a handover of a wireless communications device from another infrastructure equipment acting as a source infrastructure equipment. The source infrastructure equipment and the target infrastructure equipment form part of a wireless communications network, but may be configured in different parts, such as for example different tracking areas to use or not to use an integrity protection scheme for protecting the integrity of user plane data transmitted to or received from wireless communications devices. The method comprises receiving a handover request message indicating a request for handover of the wireless communications device from the source infrastructure equipment to the target infrastructure equipment, receiving an indication from the source infrastructure equipment as to whether or not user plane data is being transmitted to or received from the wireless access network via the source infrastructure equipment using an integrity protection scheme, determining whether or not the integrity protection scheme for the user plane data is supported by the target infrastructure equipment, transmitting a handover command to the source infrastructure equipment to indicate to the source infrastructure equipment that the source infrastructure equipment should handover the wireless communications device to the source infrastructure equipment, and providing an indication as to whether or not the integrity protection scheme can be used for transmitting or receiving user plane data via the target infrastructure equipment. The indication may be provided for example as an information element in the handover command or other message. In other examples, the indication may be provided by no information element or no indication message, where there is no change between whether or not the integrity protection is enabled or disabled between the source and the target infrastructure equipment. Accordingly integrity protection of user plane data can be enabled or disabled as the wireless communications device roams to different parts of a wireless communications network in which the integrity protection scheme is enabled or disabled or uses a different integrity protection scheme and responds by appropriately configuring its radio access bearers.

Various further aspects and features of the present invention are defined in the appended claims and includes methods performed respectively in an infrastructure equipment acting as a source and a target in handover of a wireless communications device, infrastructure equipment and a wireless communications device and a system. The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 4 is an example message structure of an RRC connection reconfiguration message;

FIG. 5 is an example information element providing a Boolean variable indicating whether integrity protection of user data is enabled or disabled in the security configuration for handover field of FIG. 4 according to the present technique;

FIG. 6 is an example information element of a user place integrity protection algorithm providing an enumerated type indicating the integrity protection of user data corresponding to the information element of FIG. 5.

DETAILED DESCRIPTION OF THE EMBODIMENTS

Figure 1:
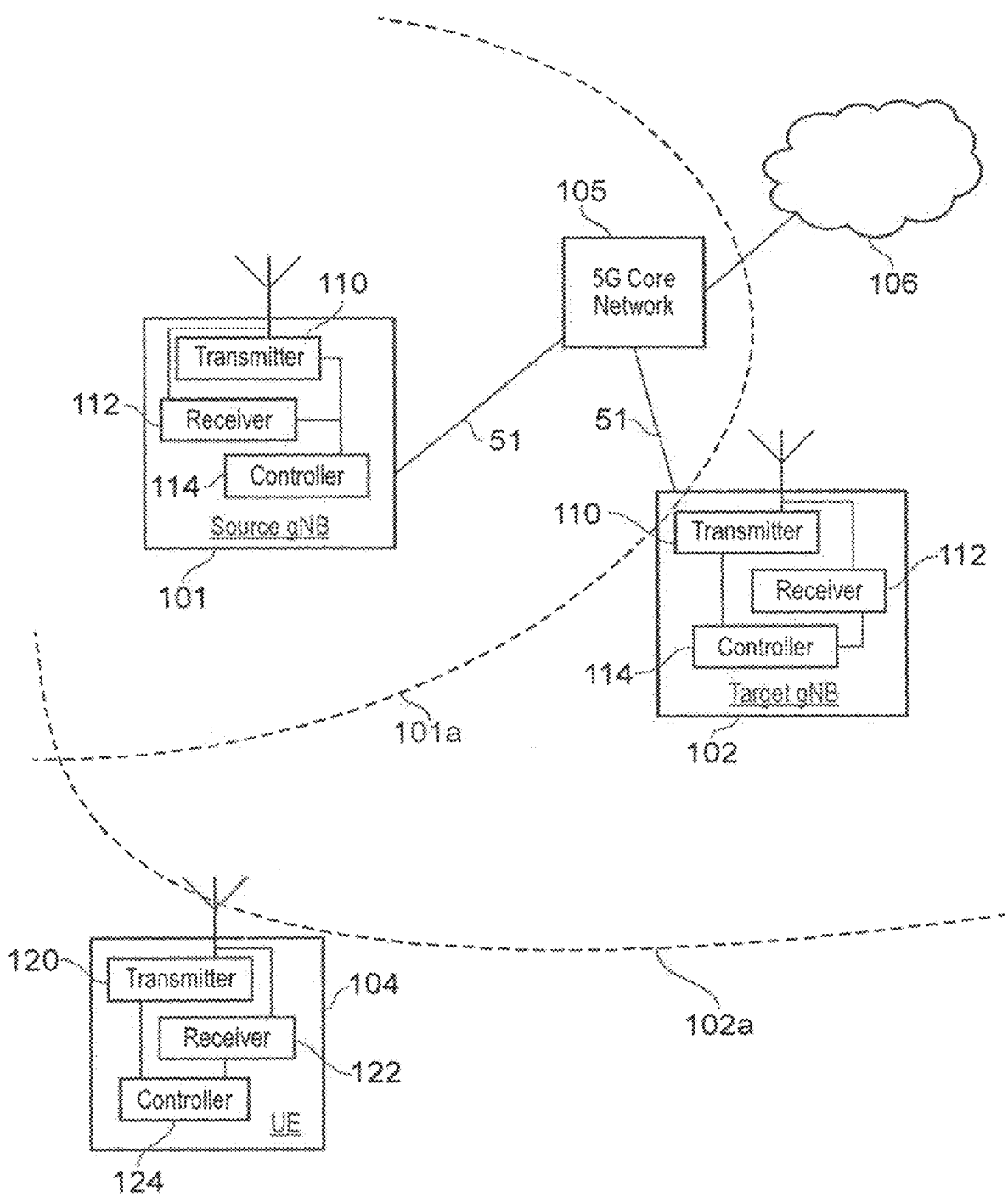
FIG. 1 is a schematic block diagram illustrating an example of a mobile communication system including base stations (eNBs, gNBs) connected to a 5G core network in which a wireless communications device (UE) is configured to handover from a source base station or cell to a target base station or cell.

Conventional Communications System FIG. 1 provides a schematic diagram illustrating some basic functionality of a mobile telecommunications network/system which may be adapted to implement embodiments of the disclosure as described further below. The mobile communications network shown in FIG. 1 may operate in accordance with a 5G standard as administered by the 3GPP. Various elements of FIG. 1 and their respective modes of operation may operate in accordance with a 5G standard, which maybe similar to other standards administered by the 3GPP (®) body, and also described in many books on the subject, for example, Holma H. and Toskala A [1]. It will be appreciated that operational aspects of the mobile communications network which are not specifically described below may be implemented in accordance with any known techniques, for example according to the relevant standards.

The network includes a plurality of base stations 101, 102, connected to a core network element 106. Each of the base stations 101, 102 provides one or more coverage areas represented symbolically as a dashed boundary line 101a. 102a (i.e. cells) within which data can be communicated to and from a communications device 104. Data is transmitted from the base stations 101, 102, 103 to communications devices such as the communications device 104 within their respective coverage areas via a radio downlink. The data is transmitted from communications devices such as the wireless communications device 104 to the base stations 101, 102 via a radio interface which provides a radio uplink and a radio downlink. Each of the base stations 101, 102 is configured to include a transmitter 110 for transmitting signals representing the data via an antenna (which maybe a plurality of antennas) on the downlink via a wireless access interface, provided by the mobile communications network, to wireless communications devices, such as the wireless communications device 104. Each base stations also includes a receiver 112 for receiving signals via the wireless access interface representing the data transmitted from wireless communications devices on the uplink and a controller 114 for controlling the transmitter 110 and the receiver 112. The controller 114 may be referred to in some embodiments as a scheduler. The uplink and downlink communications may be made using radio resources that are licensed for exclusive use by an operator of the network to form the wireless access interface.

The core network 105, represents one or more core network infrastructure equipment which may be configured to route data to and from the communications device 104 via the respective base stations 101, 102 from and to other fixed line or wireless communications networks which are represented general as a cloud 106. The core network 105 provides functions such as authentication, mobility management, charging and so on.

The wireless communications device 104 may also be referred to as mobile stations, user equipment (UE), user device, mobile radio, and so forth. Base stations may also be referred to as transceiver stations/NodeBs/eNodeBs (eNB for short) or for 5G gNB, and so forth. As with the base stations 101, 102, the wireless communications device 104 also includes a transmitter 120 for transmitting signals representing data on the uplink of the wireless access interface to the base stations 101, 102 and a receiver 122 for receiving signals representing data on the downlink via the wireless access interface. The transmitter 120 and the receiver 122 are controlled by a controller 124. As will be explained shortly, the controller 124 may perform other functions such as forming other layers in a protocol stack in accordance with communications protocols for communicating data to and from the mobile communications network.

Within both the base stations or eNodeBs (eNBs or gNBs) and the UE 104, the transmitter 110, 120 (or transmitter circuitry), the receiver 112, 122 (or receiver circuitry), and the controller 114, 124 (or controller circuitry) may be implemented using hardware circuits and/or software configured processors. For example, the controller 114, 124 may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The base stations or eNodeBs may comprise more than one communications interface (and associated transmitter and receiver circuitry), such as a wireless communications interface for communication with one or more UEs and a communications interface (which may be wired or wireless) for communication with one or more core network equipment.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. Other examples of wireless communications systems include those operating in accordance with 5G in which a radio network is formed by infrastructure equipment referred to as wireless transceiver units.

The eNodeBs 101 and 102 are examples of base stations according to a possible future network architecture (which may be referred to as '5G') in which the radio access network is connected to a new core network such as 5G core network 105 which may comprise core network equipment (not shown in detail). The 5G core network 105 may comprise one or more Access and Mobility Management Functions (AMF) (not shown in FIG. 1). The eNodeBs 101 and 102 may be connected to an AMF within the 5G core network 105. In the following description the eNodeBs will be referred to as gNodeB (gNB) to correspond to 5G terminology to differentiate from 4G eNodeBs. Similarly for brevity the wireless communications devices will be referred to as UEs.

As will be explained shortly, embodiments of the present technique provide improvements in or relating to a handover of a wireless communications device or UE from a current gNB via which the UE is transmitting or receiving data to another gNB via which the UE will transmit or receive data after handover. The gNB via which the UE is transmitting or receiving data before handover is commonly referred to as a source gNB 101 and the gNB via which the UE transmits and receives data after handover is referred to as target gNB 102.

As indicated above the controller 124 in the UE 104 and the controller 114 in the source and target gNB may be configured to transmit and receive data using commonly-used communications protocols at different inter-connecting layers to form a communications bearer from the UE via the mobile communications network to transmit and/or to receive data from a termination point for example using internet protocol packets. An example of such an arrangement is shown in FIG. 2.

Figure 2:
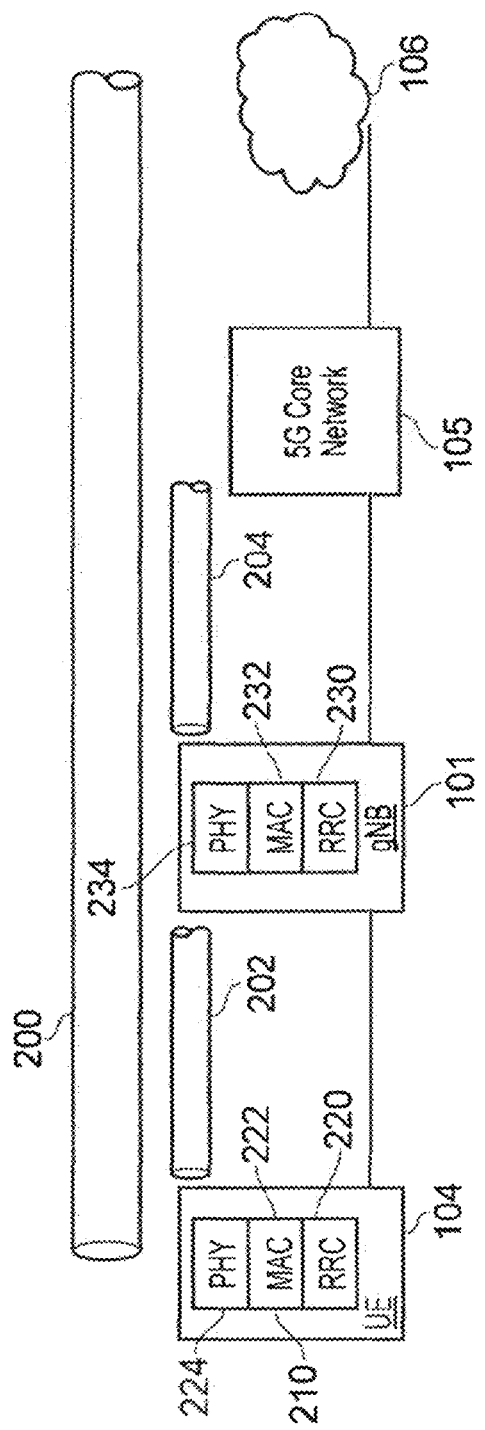
FIG. 2 is a schematic illustration showing an arrangement in which a communications bearer communicates data to and/or from a wireless communications device to a terminating point in a network, which is implemented by a radio bearer.

As illustrated in FIG. 2, the UE 104, the gNB 101 (for example the source gNB) and the core network 105 are configured to form a communications bearer 200 which is used to transmit and/or receive data to and/or from the UE from and/or to a terminating point in the network 106. Data received by the core networks 105 for transmission to the UE 104 is typically formed of packets which are formatted according to a specified protocol. In the following description, it is assumed that these packets are formed in accordance with an internet protocol (IP). However, it will be appreciated that any other appropriate packet format may be used instead.

The communications bearer 200 shown in FIG. 2 forms a logical connections between the 5G core network 105, the gNB 101 and the UE 104. An IP packet received in the 5G core network 105 is assigned to one or more quality of service (QoS) flows of the communications bearer 200. Each of the QoS flows may be characterised by a QoS flow ID and may be associated with a quality of service requirement (such as one or more of a guaranteed bit rate, a maximum bit rate, a maximum latency, a permitted packet loss ratio and the like). Although not shown in FIG. 2, each QoS flow is end to end between the 5G core network 105 and the UE 104. As shown in FIG. 2, the communications bearer 200 is formed from a data radio bearer 202 between the UE 104 and the gNB 101 and an S1 bearer 204 between the gNB 101 and the core network 105. To form the communications bearer 200, the gNB 101 establishes a logical connection with the UE 104 which is the data radio bearer (DRB) 202. The DRB 202 may operate substantially in accordance with the specifications for LTE radio bearers. The DRB 202 may be associated with a pair of corresponding packet data convergence protocol (PDCP) entities between the UE 104 and the gNB 101 formed by a protocol stack in each of the UE 104 and gNB 101 operating as peer entities. As shown within each of the UE 104 and the gNB 101 a protocol stack 210, 212 provides a physical layer 220, radio interface protocols such as a radio link control (RLC) protocol in accordance with a radio resource control layer 220, 230, a medium access control (MAC) protocol layer 222, 232 and a physical layer 224, 234 which co-operate to provide the DRB 202 via the wireless access interface between the eNodeB and the UE. The physical layer 224, 234 may be formed in part by the transmitter 110, 120 and the receiver 112, 122 in the UE 104 and gNBs 101, 102. Protocols that operate above the IP protocol layer, such as a user datagram protocol (UDP), a transmission control protocol (TCP) and a hypertext transfer protocol (HTTP), may also be used. Transport protocols such as those that operate between the core network and the eNodeB may also be used.

As mentioned above, embodiments of the present technique address technical problems in handover of a UE from one a source base station (eNB or gNB) to a target base stations in which integrity protection of user data in the target is not enabled for a particular service, quality of service flow or within a region, whereas the source gNB 101 does support integrity protection of user data. Correspondingly, in other embodiments, the target gNB 102 may be configured to support integrity protection whereas the source gNB 101 may not be configured to support integrity protection and the UE may be desire to use integrity protection.

Integrity Protection for User Data

Integrity Protection schemes or algorithms are arranged to improve the integrity of communicated data. Such techniques are designed to prevent or at least reduce a likelihood of data transmitted being intercepted and altered in some way or to provide proof of the source of the data (provenance). For future mobile communications systems, it has been proposed by 3GPP SA3 working group to use Integrity Protection (IP) schemes for user plane data. However a technical problem may result during handover. If an IP scheme is configured in a source cell and a target cell which results from the handover does not support the IP scheme or vice versa then a UE might incorrectly assume that the IP scheme would continue to be supported in the target cell. The reverse situation may also occur in that that target cell can support an IP scheme, whereas the source cell does not support the IP scheme.

Integrity Protection (IP) schemes are a general class of processes and algorithms for providing confidentiality and/or provenance of data from a source. IP schemes have been developed by 3GPP and so those acquainted with technology in the field of the present technique will be familiar with IP schemes and so further details will not be provided here, (for example see http://www.3gpp.org/specifications/60-confidentiality-algorithms the contents of which are herein incorporated by reference). However, embodiments of the present technique relate generally to enabling and disabling such IP schemes or protocols for user data during handover.

Performing IP check on user data should normally be an operator policy and deployed throughout a mobile communications network. In other words, it seems unlikely that a network operator will procure base stations from different vendors with different IP schemes or check capabilities and indeed it may be part of a standardised configuration to require that IP schemes are supported. However, there are still some scenarios in which an IP scheme may or may not be configured between source and target base stations or cells. For example, in a situation in which a radio access network is shared between different operators a radio access network may be different between different gNBs so that one operator has enabled an IP scheme for user plane data while the other operator has disabled the IP scheme. As such, a UE moving from shared network to sole network base stations or vice versa will require a different IP scheme configuration. Another example in which the IP scheme may be enabled differently between gNBs operating to serve a UE is a case where a shared cell is unlicensed and needs protection against a so called "man in the middle" attack. A man in the midddled attack is where a third party introduces packets into a communications bearer as a misrepresentation of what was intended by the source of the communications bearer.

Licensed cells are deployed by an operator in a slightly more secure environment, in which a man in the middle attack would not be expected. Alternatively, an operator unique selling point may be security and may rely on a different policy or security priority in different parts of the network determined by other market driven factors. Therefore embodiments of the present technique are arranged to address a technical problem in which there is a different IP scheme configured in different parts of a network or interconnected networks.

It has been proposed in LTE to provide an arrangement in which handover signalling mentions an exchange of security algorithm configuration. For example, there is an option to set an IP scheme to "0" in the sense that the IP scheme is disabled with no integrity protection. It is known that integrity protection is mandatory for radio resource control (RRC) signalling in LTE, which should be the same for 5G. Furthermore no integrity protection is permitted to be used for emergency calls. Therefore, disabling the IP scheme does not solve a problem of user plane data IP enabling/disabling unless this is indicated explicitly.

Delta configuration is known to those familiar with 3GPP standards to be an arrangement in which during handover of a wireless access device from a source gNB 101 to a target gNB 102 it is assumed that the DRB 202 will be configured as the same in the target gNB 102 as the source gNB 101. As such only differences in the configuration of DRB when changing from the source gNB to the target gNB are signalled from the target gNB 102 to the source gNB 101 for communicating the to UE 104. Therefore, due to the nature of delta configuration at the time of handover (same configuration as source cell is not signaled by the target cell in delta configuration). According to embodiments of the present technique there is provided an explicitly indication of an IP check status of the target cell in handover command message.

If the source gNB 101 has an IP scheme configured and the target gNB 102 does not support the IP scheme then, according to the delta configuration signalling as part of the handover as explained above, the absence of a configuration in a handover command may imply that the IP scheme is supported by the target gNB 102. However, as an alternative a complete re-configuration may be required for the DRB between the source gNB 101 and the target gNB 102. This would otherwise be the only way to deal with such non-supported features, which is a very heavy procedure which may require reset of all layers and re-establishing them to support the DRB from the target eNB 102. Without a solution to a change in an IP scheme configuration between a source gNB 101 and a target gNB 102 during handover then an IP scheme indication failure may occur after handover as the UE will assume the same configuration in the target gNB 101 as source gNB 102. UE may then be required to perform RRC re-establishment procedure and finally get a configuration for the target gNB 102 to discover that the IP scheme is not supported. Such an RRC re-establishment may bring disruption in the connection, which represents a disadvantage.

Embodiments of the present techniques can provide a wireless communications system comprising at least an infrastructure equipment acting as a target for a handover of a wireless communications device from another infrastructure equipment acting as a source infrastructure equipment. The source infrastructure equipment and the target infrastructure equipment form part of a wireless communications network. The system is configured to include in at least one message transmitted between at least two of the wireless communications device, the source base station and the target base station an information element indicating that integrity protection of user data transmitted to or received from the mobile communications network via one or both of the source infrastructure equipment or the target infrastructure equipment is enabled or disabled. Accordingly integrity protection can be enabled or disabled for communicating user plane data using a radio bearer established with a handover procedure with a target infrastructure equipment (gNB) in accordance with whether an integrity protection scheme has been enabled for the target gNB compared to the source gNB.

Embodiments of the present technique can provide an arrangement in which a new information element is introduced into an RRC reconfiguration message, which explicitly states whether or not an IP scheme is supported by the target gNB. The information element may be signalled in the following cases:

If an IP scheme has been enabled in the source gNB 101 and target gNB 102 does not support the IP scheme for user data:

If the source gNB 101 does not support an IP scheme but the target gNB 102 can be configured to support an IP scheme;

An explicit indication can be provided even if an IP scheme configuration does not change between the source gNB and the target gNB.

Figure 3:
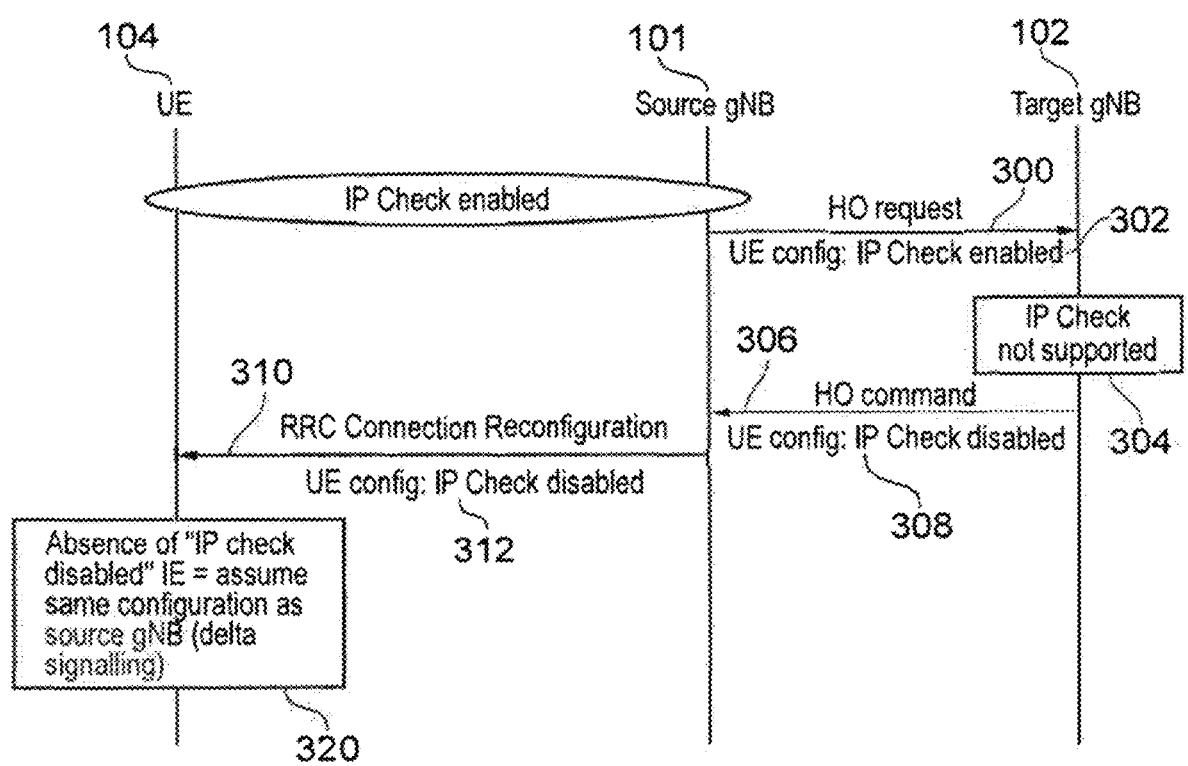
FIG. 3 is a message flow diagram illustrating a handover process of a wireless communications device from a source base station (gNB) to a target base station (gNB) in which the handover process includes communication one or more information elements between the source base station, the target base station and the wireless communications device indicating whether an integrity protection scheme is enabled or disabled for user data.

FIG. 3 provides an example message flow diagram in which a UE hands over from a source gNB to a target gNB in a mobile communications network in accordance with an example embodiment of the present technique. According to the example shown in FIG. 3, a UE 104, before handover, is transmitting and/or receiving data via a sourced gNB 101 using a communications bearer in which an IP scheme has been enabled. In accordance with a conventional arrangement a UE 104 is measuring signals received from the source gNB and other gNBs including a target gNB 102 and reporting these measurements such as RSSI and RSRP to the source gNB 101. The source gNB 101 then determines whether the UE 104 should hand over from the source gNB 101 to another gNB and for the present example this is the target gNB 102. Accordingly, the source gNB 101 transmits a handover request message 300 to the target gNB 102. According to the present technique the handover request message 300 includes an information element providing an indication that the UE 104 is configured with a DRB 202 with the source gNB 101 and had an IP scheme enabled as represented by a field 302.

The target gNB 102 then determines whether or not it can support the IP scheme of the DRB 202 provided by the source gNB 101. For the example as illustrated in FIG. 3, the target gNB 102 cannot support the IP scheme or can only support a different IP scheme which was provided by the source gNB 101. Accordingly, in a process step 304 the target gNB 102 determines that it cannot support the IP scheme provided by the source gNB 101. The target gNB 102 transmits a handover command 306 to the source gNB 101 which includes an information element in a field which indicates that the IP scheme should be disabled 308 before, during or after handover. The source gNB 101 then receives the handover command 306, which identifies that the IP scheme will be disabled by the target gNB 102 and accordingly transmits an RRC connection reconfiguration message 310 to the UE 104 which includes a field 312 indicating that the IP scheme should be disabled after, during or before the handover from the source gNB 101 to the target gNB 102. However as illustrated by a process step 320 the UE in some examples may assume that it should adopt the same configuration as the source gNB 101 in the absence of receiving an information element in a message indicating that the IP scheme should be disabled.

Various further aspects and features of the present invention are defined in the appended claims. According to another example embodiment an IP scheme can be disabled by the source gNB 101 before handover execution. If the source gNB is provided with an indication using signalling between peer gNBs, referred to as Xn signalling that the target gNB 102 does not support the IP check for user plane data then the source gNB 101 can configure the RAB to disable the IP scheme before handover to the target gNB 102 is executed. Alternatively the target gNB 102 can reject the handover request message by sending a Handover Reject message to the source gNB 101 with the cause that the integrity protection configuration is not valid. Xn signalling is the equivalent of X2 signalling between base stations in LTE Those acquainted with 3GPP may be aware that relay nodes according to the 3GPP standard release 10 can support an IP scheme for DRBs carrying S1/X2 signalling. However, an information element carrying a relay node IP scheme protection does not solve a technical problem addressed by embodiments of the present technique described above because the relay node information element is carried inside a DRB configuration. The DRB configuration may be absent if no a new DRB is setup during handover, whereas typically a new DRB is not setup or modified during handover. Furthermore, although relay nodes can support user plane IP schemes, these are a mandatory feature for relay nodes. Therefore base stations can support integrity protection for user plane data as S1/X2 signalling carried over a DRB between a relay node and a donor eNodeB (DeNB) is always integrity protected, in that it does not change. However, according to some applications user plane IP schemes may be optional and may depend on operator policy.

Example Information Elements

FIGS. 4, 5 and 6 provide example implementations of an information element which provides an indication as to whether or not an IP scheme is supported by a source gNB or a target gNB. FIG. 4 represents an example of an existing structure for the RRC reconfiguration message 310 transmitted from the source gNB 101 to the UE 104. However in line 400 of this message structure an indication is provided of "securityconfigHO", which indicates to the UE 104 whether or not the IP scheme is enabled or disabled. An example shown in FIG. 5, provides a structure of the securityconfigHO of FIG. 4 and shows in line 500 a field identified as "IntegrityCheckUserData". As shown for example in FIG. 6, a structure of the inter radio access technology SecurityAlgorithmConfig field includes an enumerated type "UserPlancintegrityProtAlgorithm" 600 which has an evaluated number indicating whether or not the IP scheme is enabled or disabled in the target gNB 102.

According to the above examples, a user plane IP scheme is enabled/disabled as the UE passes between different base stations of a mobile communications network and/or between mobile communications networks. However, it may happen that different operators of different mobile communications networks may have a different policy regarding user plane integrity protection for different DRBs. As such the above mentioned information element is provided for a handover command to that an IP scheme can be enabled/disabled in accordance with whether or not the IP scheme is supported by a gNB or not. Accordingly a handover command including an information element enabling/disabling the IP scheme is provided per DRB setting.

According to another example embodiment an information element which is currently used for relays is reused but having two values instead. Currently, in the spec, rn-IntegrityProtection-rl0 has single value as ENUMERATED (enabled). However in accordance with an example embodiment this variable is adapted to include (enabled, disabled). This information element, such as for example a Boolean value "IntegrityCheckUserData" is inserted at the place of "rn-IntegrityProtection-r10" in order to identify during handover whether or not the IP scheme can be supported by the target gNB.

There are various reasons for determining whether the IP scheme should be enabled or disabled according to different or the same example embodiments. Two example options are:

Option 1: Operator policy is locally configured in the gNB, based for example on whether QoS flows or PDU sessions have been configured with an IP scheme.

Option 2: An IP scheme configuration can be signalled per UE per PDU session or per QoS Flow or per communications bearer. If this is the case then source gNB is configured to receive an indication that an IP scheme should be configured from an MME or AMF. The source gNB then communicates the IP scheme configuration to the target gNB according to the above example embodiments in Handover request message 300.

According to some example embodiments, a configuration of an IP scheme could be valid over tracking area or any other configuration. As such if an operator wants to use an IP scheme over a shared radio access network, then the IP scheme could be limited to part of the network, for example a tracking area. As for this example, the Target gNB can check on the basis of the tracking area not determine whether or not it can support the IP scheme.

In some example embodiments the target 102 gNB may be configured to transmit a hand over reject message to source gNB 102, if the target gNB is not enabled to support the integrity protection scheme for the user plane data and the DRB from the UE to the source gNB is enabled to support transmitting or receiving the user plane data to and/or from the wireless access network via the source infrastructure equipment using the integrity protection scheme.

As will be appreciated by the skilled person, various combinations of the embodiments described above are possible. For example, with reference to FIG. 4, embodiments described above which relate to the handover preparation phase 401 may be combined with embodiments described above which relate to data forwarding steps 403 and 404 and the corresponding processing of data.

Summary of Operation

Figure 7:
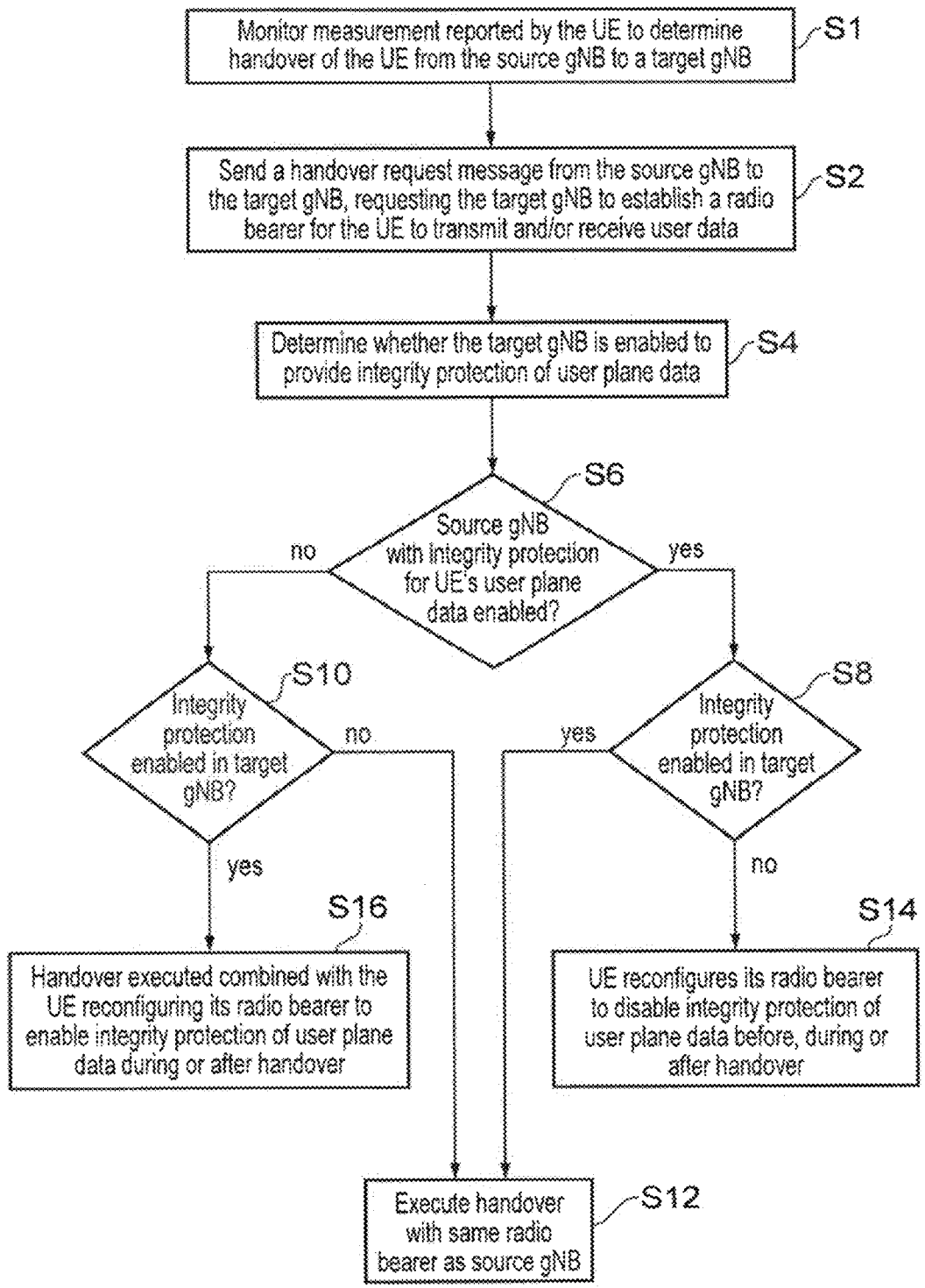
FIG. 7 is a flow diagram illustrating an example handover process in which integrity protection of user plane data between a source base station (gNB) and a target base station (gNB) is managed.

FIG. 7 provides an example flow diagram illustrating a handover process in which integrity protection of user plane data is managed as a UE handovers from a source gNB to a target gNB. The integrity protection of the user plane data is managed in the sense that if the UE is currently using user plane integrity protection through the source gNB then as part of the process illustrated in FIG. 7 it is determined whether the target gNB can support integrity protection in that the integrity protection scheme is enabled for the target gNB. On the other hand, if the UE is not currently using integrity protection for its user plane data because this is not enabled with the source gNB then the process provides an arrangement in which the integrity protection of the user plane data can be activated if the target gNB has the integrity protection of user plane data enabled. FIG. 7 is summarised as follows:

S1: In accordance with a conventional arrangement, a UE monitors signals received from a gNB through which is it currently communicating and for which it has established a radio bearer. The UE also monitors signal quality (RSSI or quality) and also signals received from other neighbouring gNBs. In accordance with a conventional arrangement therefore the UE reports these signal quality measurements to the serving gNB which determines whether or not the UE should handover to another of the neighbouring gNB's. Thus the serving gNB is the source gNB whereas the gNB identified as the gNB to which the UE should handover is referred to as the target gNB.

S2: The source gNB then sends a handover request message to the target gNB requesting that the target gNB act as the serving gNB for the UE which requires the establishment of a radio bearer with the UE as the UE hands over from the source gNB to the target gNB. Again this is in accordance with a conventional arrangement.

S4: It is then determined whether the target gNB is enabled to provide integrity protection of user plane data. In one example this can be by interrogating the wireless communications network which may include for example, in an AMF or MME an indication as to whether or not the target gNB is enabled to provide integrity protection of user plane data. In this case, if the source gNB receives an indication from the wireless communications network that the target gNB is enabled for integrity protection of user plane data then the hand over request message in step S2 may include an instruction to the target gNB to provide integrity protection of the user plane data for the UE. As an alternative, in response to the hand over request message, the handover command received from the target gNB may include an indication as to whether or not the target gNB is enabled to support the integrity protection of the user plane data for the UE.

S6: At a decision point S6, the source gNB or the target gNB determines whether the source gNB integrity protection for user plane data is enabled. If it is enabled then processing proceeds to step S8 and otherwise if it is not enabled then processing proceeds to step S10.

S8: If integrity protection is enabled in the source gNB for the user plane data then at step S8 it is determined whether or not integrity protection is enabled in the target gNB. As indicated above, this could be determined by the source gNB by interrogating the communications network. Alternatively, in response to the handover request message, the target gNB could respond to the source gNB to give the handover command which includes an information element indicating that the integrity protection is enabled or disabled in the target gNB. If integrity protection is enabled in the target gNB then processing proceeds to step S12 where the same radio bearer configuration in respect of the integrity protection can be used for the target gNB as is used for the source gNB. This may or may not require an information element communicated to the source gNB or the UE itself.

S14: If integrity protection is disabled in the target gNB then in step S14 the UE reconfigures the radio bearer to disable the integrity protection of the user plane data. The radio bearer may be reconfigured before, during or after the handover to the target gNB is executed. In one example, the source gNB sends an RRC reconfiguration message to the UE to reconfigure the radio bearer in advance of the handover to the target gNB to disable integrity protection of user plane data. For this example where the radio bearer is reconfigured before the handover, then process then proceeds to step S16 to execute the handover. Alternatively, the integrity protection of the user plane data could be disabled during the handover or indeed after the handover. For this example, the radio bearer is reconfigured by the target gNB, when the UE is communicating via the target gNB.

S10: In correspondence with the determination performed at step S8, in step S10 it is determined whether integrity protection of the user plane data is enabled in the target gNB. If there is no integrity protection enabled in the target gNB then processing proceeds to step S12 because there is no change in respect of integrity protection with respect to the radio bearer in the target gNB compared to the source gNB.

S16: In contrast if integrity protection is enabled in the target gNB 102 whereas the source gNB has disabled the integrity protection then at step S16 the UE reconfigures the radio bearer to enable the integrity protection of the user plane data. The radio bearer may be reconfigured during or after the handover to the target gNB is executed. For this example, the radio bearer is reconfigured by the target gNB, when the UE is communicating via the target gNB.

Various aspects and features of the present technique are defined in the appended claims. Various modifications may be made to the example embodiments as disclosed above as appreciated by the skilled person within the scope of the appended claims. Various further example embodiments and features are defined in the following numbered paragraphs:

Paragraph 1. A method performed in an infrastructure equipment acting as a target for a handover of a wireless communications device from another infrastructure equipment acting as a source infrastructure equipment, the source infrastructure equipment and the target infrastructure equipment forming part of a wireless communications network, the method comprising receiving a handover request message indicating a request for handover of the wireless communications device from the source infrastructure equipment to the target infrastructure equipment, receiving an indication from the source infrastructure equipment as to whether or not user plane data is being transmitted to or received from the wireless access network via the source infrastructure equipment using an integrity protection scheme.

determining whether or not the integrity protection scheme for the user plane data is supported by the target infrastructure equipment, transmitting a handover command to the source infrastructure equipment to indicate to the source infrastructure equipment that the source infrastructure equipment should handover the wireless communications device to indicate to the source infrastructure equipment, and providing an indication as to whether or not the integrity protection scheme can be used for transmitting or receiving user plane data via the target infrastructure equipment.

Paragraph 2. A method according to paragraph 1, wherein the providing the indication as to whether or not the integrity protection scheme can be used for transmitting or receiving user plane data via the target infrastructure equipment comprises depending on whether or not the integrity protection scheme of the user plane data is supported with respect to whether or whether or not the integrity protection scheme is being used to transmit user plane data to or received from the source infrastructure equipment, transmitting an indication as to whether or not the integrity protection scheme for the user plane data is supported by the target infrastructure equipment.

Paragraph 3. A method according to paragraph 1 or 2, wherein the handover request message includes an information element providing the indication from the source infrastructure equipment as to whether or not user plane data is being transmitted to or received from the wireless access network via the source infrastructure equipment using the integrity protection scheme.

Paragraph 4. A method according to paragraph 1, 2 or 3, wherein the handover command includes an information element providing the indication as to whether or not the integrity protection scheme for the user plane data is supported by the target infrastructure equipment.

Paragraph 5. A method according to any of paragraphs 1 to 4, wherein the transmitting the indication as to whether or not the integrity protection scheme for the user plane data is supported by the target infrastructure equipment includes
- if the integrity protection scheme for the user plane data is not enabled for the target infrastructure equipment and the user plane data is being transmitted to or received from the source infrastructure equipment using the integrity protection scheme, transmitting the indication that the target infrastructure equipment is not enabled for the integrity protection of the user plane data for configuration for the wireless communications device as part of the handover, or
- if the target infrastructure equipment is enabled to support the integrity protection of the user plane data and the user plane data is being transmitted to or received from the source infrastructure equipment using the integrity protection scheme, then not transmitting the indication that the target infrastructure equipment is not enabled to support the integrity protection of the user plane data, the source infrastructure equipment assuming the same configuration of the integrity protection scheme for the target infrastructure equipment as for the source infrastructure equipment.

Paragraph 6. A method according to any of paragraphs 1 to 4, wherein the transmitting the indication as to whether or not the integrity protection scheme for the user plane data is supported by the target infrastructure equipment includes
- if the integrity protection scheme for the user plane data is not enabled for the target infrastructure equipment and the user plane data is being transmitted to or received from the source infrastructure equipment without using an integrity protection scheme, transmitting the indication that the target infrastructure equipment can support the integrity protection of the user plane data for configuration for the wireless communications as part of the handover, or
- if the target infrastructure equipment is not enabled to support the integrity protection of the user plane data and the user plane data is being transmitted to or received from the source infrastructure equipment without using an integrity protection scheme, then not transmitting the indication that the target infrastructure equipment is enabled to support the integrity protection of the user plane data, the source infrastructure equipment assuming the same configuration of the integrity protection scheme for the target infrastructure equipment as for the source infrastructure equipment.

Paragraph 7. A method according to any of paragraphs 1 to 6, comprising
configuring a radio resource control layer provided by the target infrastructure equipment to manage radio resources provided by the target infrastructure equipment in accordance with whether or not the target infrastructure equipment can support the integrity protection scheme of the user plane data to be transmitted to or received from the wireless communications device.

Paragraph 8. A method according to any of paragraphs 1 to 7, wherein the wireless communications device is configured to enable or disable the integrity protection scheme in accordance with whether or not the integrity protection scheme can be supported by the target infrastructure equipment.

Paragraph 9. A method according to any of paragraphs 1 to 8, wherein the source infrastructure equipment and the target infrastructure equipment are configured to operate in different parts of the mobile communications network, each different part of the mobile communications network being configured with an integrity protection scheme enabled or disabled differently with respect to the other part.

Paragraph 10. A method according to any of paragraphs 1 to 9, comprising transmitting to the source infrastructure equipment a hand over reject message, either if the target infrastructure is disabled from supporting the integrity protection scheme for the user plane data and the source infrastructure equipment is enabled to support the transmitting the user plane data to or receiving the user plane data from the wireless access network, or if the target infrastructure is enabled to support the integrity protection scheme for the user plane data and the source infrastructure equipment is disabled from supporting the integrity protection scheme for transmitting user plane data to or receiving user plane data from the wireless access network.

Paragraph 11. A method according to paragraph 10, wherein the different parts of the mobile communications network are different tracking areas.

Paragraph 12. An infrastructure equipment configured to act as a target for a handover of a wireless communications device from another infrastructure equipment acting as a source infrastructure equipment, the source infrastructure equipment and the target infrastructure equipment forming part of a wireless communications network, the infrastructure equipment comprising
- transmitter circuitry configured to transmit signals representing data via a wireless access interface provided by the mobile communications network to one or more wireless communications devices,
- receiver circuitry configured to receive signals representing data transmitted via the wireless access interface by one or more of the wireless communications devices, and
- controller circuitry configured to control the transmitter circuitry and the receiver circuitry to configure radio bearers for transmitting data to or receiving data from one or more of the wireless communications devices, wherein the controller circuitry is configured
  - to receive a handover request message from the source infrastructure equipment for handover of one of the wireless communications devices from the source infrastructure equipment to the target infrastructure equipment to transmit data to or receive data from the mobile communications network via a radio bearer configured by the controller circuitry,
  - to receive an indication from the source infrastructure equipment as to whether or not user plane data is being transmitted to or received from the wireless access network via the source infrastructure equipment using an integrity protection scheme, to determine whether or not the integrity protection scheme for the user plane data can be supported by the target infrastructure equipment, to transmit a handover command to the source infrastructure equipment to indicate to the source infrastructure equipment that the source infrastructure equipment should handover the wireless communications device to indicate to the source infrastructure equipment, and to provide an indication as to whether or not the integrity protection scheme can be used for transmitting or receiving user plane data via the target infrastructure equipment.

Paragraph 13. A method performed in an infrastructure equipment acting as a source infrastructure equipment for a wireless communications device before handing over to another infrastructure equipment acting as a target infrastructure equipment, the source infrastructure equipment and the target infrastructure equipment forming part of a wireless communications network, the method comprising transmitting a handover request message to the target infrastructure equipment indicating a request for handing over the wireless communications device from the source infrastructure equipment to the target infrastructure equipment, transmitting from the source infrastructure equipment to the target infrastructure equipment an indication as to whether or not user plane data is being transmitted to or received from the wireless access network via the source infrastructure equipment using an integrity protection scheme, and receiving a handover command from the target infrastructure equipment indicating that the source infrastructure equipment should handover the wireless communications device to the target infrastructure equipment, and an indication as to whether or not the integrity protection scheme can be used for transmitting or receiving user plane data via the target infrastructure equipment.

Paragraph 14. A method according to paragraph 13, wherein the indication as to whether or not the integrity protection scheme can be used for transmitting or receiving user plane data via the target infrastructure equipment comprises depending on whether or not the integrity protection scheme of the user plane data is supported with respect to whether or whether or not the integrity protection scheme is being used to transmit user plane data to or received by the source infrastructure equipment, receiving an indication as to whether or not the integrity protection scheme for the user plane data is supported by the target infrastructure equipment.

Paragraph 15. A method according to paragraph 13 or 14, wherein the handover request message includes an information element providing the indication from the source infrastructure equipment as to whether or not user plane data is being transmitted to or received from the wireless access network via the source infrastructure equipment using the integrity protection scheme.

Paragraph 16. A method according to paragraph 13, 14 or 15, wherein the handover command includes an information element providing the indication as to whether or not the integrity protection scheme for the user plane data is supported by the target infrastructure equipment.

Paragraph 17. A method according to any of paragraphs 13 to 16, wherein the indication as to whether or not the integrity protection scheme for the user plane data is supported by the target infrastructure equipment includes if the integrity protection scheme for the user plane data is not enabled for the target infrastructure equipment and the user plane data is being transmitted to or received from the source infrastructure equipment using the integrity protection scheme, receiving the indication that the target infrastructure equipment is not enabled for the integrity protection of the user plane data for configuration for the wireless communications device as part of the handover, or if the target infrastructure equipment is not enabled for the integrity protection of the user plane data and the user plane data is being transmitted to or received from the source infrastructure equipment using the integrity protection scheme, then not receiving the indication that the target infrastructure equipment is not enabled for the integrity protection of the user plane data, the source infrastructure equipment assuming the same configuration of the integrity protection scheme for the target infrastructure equipment as for the source infrastructure equipment.

Paragraph 18. A method according to any of paragraphs 13 to 16, wherein the indication as to whether or not the integrity protection scheme for the user plane data is supported by the target infrastructure equipment includes if the integrity protection scheme for the user plane data is not enabled for the target infrastructure equipment and the user plane data is being transmitted to or received from the source infrastructure equipment without using an integrity protection scheme, receiving the indication that the target infrastructure equipment is not enabled for the integrity protection of the user plane data for configuration for the wireless communications as part of the handover, or if the target infrastructure equipment is not enabled for the integrity protection of the user plane data and the user plane data is being transmitted to or received from the source infrastructure equipment without using an integrity protection scheme, then not receiving the indication that the target infrastructure equipment is enabled for the integrity protection of the user plane data, the source infrastructure equipment assuming the same configuration of the integrity protection scheme for the target infrastructure equipment as for the source infrastructure equipment.

Paragraph 19. A method according to paragraph 13 or 14, comprising determining, from the mobile communications network, whether or not, the target infrastructure equipment is enabled to support the integrity protection scheme, and if the target infrastructure equipment is enabled to support the integrity protection scheme, including in the handover request message an information element directing the target infrastructure equipment to enable the integrity protection scheme for transmitting or receiving user plane data via the target infrastructure equipment.

Paragraph 20. A method according to any of paragraphs 13 to 19, wherein the wireless communications device is configured to enable or disable the integrity protection scheme in accordance with whether or not the integrity protection scheme can be supported by the target infrastructure equipment.

Paragraph 21. A method according to any of paragraphs 13 to 20, wherein the source infrastructure equipment and the target infrastructure equipment are configured to operate in different parts of the mobile communications network, each different part of the mobile communications network being configured with an integrity protection scheme enabled or disabled differently with respect to the other part.

Paragraph 22. A method according to paragraph 21, wherein the different parts of the mobile communications network are different tracking areas.

Paragraph 23. A method according to any of paragraphs 13 to 22, wherein the transmitting from the source infrastructure equipment to the target infrastructure equipment the indication as to whether or not the user plane data is being transmitted to or received from the wireless access network via the source infrastructure equipment using an integrity protection scheme, comprises transmitting to the target infrastructure equipment an indication of a configuration of a data radio bearer which has been established for receiving the user data from the wireless communications device at the source infrastructure equipment or transmitting the user data to the wireless communications device from the source infrastructure equipment, and the receiving from the target infrastructure equipment the indication as to whether or not the integrity protection scheme for the user plane data can be supported by the target infrastructure equipment includes receiving an indication of a difference between a configuration of a radio bearer for receiving the user data from the wireless communications device at the target infrastructure equipment and the configuration of the radio bearer for receiving the user data from the wireless communications device at the source infrastructure equipment or a difference between a configuration of a radio bearer for transmitting the user data to the wireless communications device from the target infrastructure equipment and the configuration of the radio bearer for transmitting the user data to the wireless communications device from the target infrastructure equipment, the difference in the configuration including an indication as to whether or not the integrity protection scheme of the user data is supported by the target infrastructure equipment.

Paragraph 24. A method according to any of paragraphs 13 to 23, wherein the user data is transmitted to or received from the wireless communications device via radio bearer established between the wireless communications device and the source infrastructure equipment, and if the indication as to whether or not the integrity protection scheme can be used for transmitting or receiving user plane data via the target infrastructure equipment indicates that is not enabled for the target infrastructure equipment, instructing the wireless communications device to reconfigure the radio bearer to disable the integrity protection scheme.

Paragraph 25. An infrastructure equipment configured to act as a source infrastructure equipment for a wireless communications device before handing over to another infrastructure equipment acting as a target infrastructure equipment, the source infrastructure equipment forming part of a wireless communications network with the target infrastructure equipment, the infrastructure equipment comprising transmitter circuitry configured to transmit signals representing data via a wireless access interface provided by the mobile communications network to one or more wireless communications devices.

receiver circuitry configured to receive signals representing data transmitted via the wireless access interface by one or more of the wireless communications devices, and controller circuitry configured to control the transmitter circuitry and the receiver circuitry to configure radio bearers for transmitting data to or receiving data from one or more of the wireless communications devices, wherein the controller circuitry is configured to transmit a handover request message to the target infrastructure equipment indicating a request for handing over the wireless communications device from the source infrastructure equipment to the target infrastructure equipment, to transmit from the source infrastructure equipment to the target infrastructure equipment an indication as to whether or not user plane data is being transmitted to or received from the wireless access network via the source infrastructure equipment using an integrity protection scheme, and to receive a handover command from the target infrastructure equipment indicating that the source infrastructure equipment should handover the wireless communications device to the target infrastructure equipment, and an indication as to whether or not the integrity protection scheme can be used for transmitting or receiving user plane data via the target infrastructure equipment.

Paragraph 26. A method performed by a wireless communications device of transmitting data to or receive data from a wireless communications network, the method comprising configuring a radio bearer for transmitting user plane data to or receiving user plane data from the source infrastructure equipment, the radio bearer being configured to use an integrity protection scheme for transmitting the user plane data to or receiving the user plane data from the source infrastructure equipment or not to use the integrity protection scheme in accordance with a configuration of the source infrastructure equipment, receiving a handover command from an infrastructure equipment acting as a source infrastructure equipment with which the radio bearer is configured, to handover to another infrastructure equipment acting as a target infrastructure equipment, and an indication to reconfigure the radio bearer to use the integrity protection scheme or not to use the integrity protection scheme depending whether or not the integrity protection scheme can be used for transmitting or receiving the user plane data via the target infrastructure equipment.

Paragraph 27. A method according to paragraph 26, wherein the indication to reconfigure the radio bearer is provided by an information element forming part of the handover command.

Paragraph 28. A wireless communications device for transmitting data to or receive data from a wireless communications network, the wireless communications device comprising transmitter circuitry configured to transmit signals representing data via a wireless access interface provided by the wireless communications network to an infrastructure equipment of the wireless communications network, receiver circuitry configured to receive signals representing data transmitted via the wireless access interface by the infrastructure equipment to the wireless communications device, and controller circuitry configured to control the transmitter circuitry and the receiver circuitry to configure radio bearers for transmitting data to or receiving data from the wireless communications network, wherein the controller circuitry is configured to configure a radio bearer for transmitting user plane data to or receiving user plane data from the source infrastructure equipment, the radio bearer being configured to use an integrity protection scheme for transmitting the user plane data to or receiving the user plane data from the source infrastructure equipment or not to use the integrity protection scheme in accordance with a configuration of the source infrastructure equipment, to receive a handover command from an infrastructure equipment acting as a source infrastructure equipment with which the radio bearer is configured, to handover to another infrastructure equipment acting as a target infrastructure equipment, and an indication that the controller circuitry should reconfigure the radio hearer to use the integrity protection scheme or not to use the integrity protection scheme depending whether or not the integrity protection scheme can be used for transmitting or receiving the user plane data via the target infrastructure equipment.

Paragraph 29. A method of performing handover of a wireless communications device from a target infrastructure equipment to and source infrastructure equipment of a wireless communications network, wherein at least one message transmitted between at least two of the wireless communications device, the source base station and the target base station includes an information element indicating that integrity protection of user data transmitted to or received from the mobile communications network via one or both of the source infrastructure equipment or the target infrastructure equipment is enabled or disabled.

Paragraph 30. A wireless communications system comprising an infrastructure equipment acting as a target for a handover of a wireless communications device from another infrastructure equipment acting as a source infrastructure equipment, the source infrastructure equipment and the target infrastructure equipment forming part of a wireless communications network, the system being configured to include in at least one message transmitted between at least two of the wireless communications device, the source base station and the target base station an information element indicating that integrity protection of user data transmitted to or received from the mobile communications network via one or both of the source infrastructure equipment or the target infrastructure equipment is enabled or disabled.

Paragraph 31. A signal representing a message exchanged within a wireless communications system comprising an infrastructure equipment acting as a target for a handover of a wireless communications device from another infrastructure equipment acting as a source infrastructure equipment, the source infrastructure equipment and the target infrastructure equipment forming part of a wireless communications network, the message being exchanged between at least two of the wireless communications device, the source base station and the target base station, the message including an information element indicating that integrity protection of user data transmitted to or received from the mobile communications network via at least one of the source infrastructure equipment or the target infrastructure equipment is enabled or disabled.

REFERENCES

[1] LTE for UMTS: OFDMA and SC-FDMA Based Radio Access, Harris Holma and Antti Toskala, Wiley 2009, ISBN 978-0-470-99401-6.

[2] 3GPP TS 36.331
[3] 3GPP TS 38.300
[4] http://www.3gpp.org-/specifications/60-confidentiality-algorithms

What is claimed is:

1. An infrastructure equipment configured to act as a source infrastructure equipment for a wireless communications device before handing over to another infrastructure equipment acting as a target infrastructure equipment, the source infrastructure equipment forming part of a wireless communications network with the target infrastructure equipment, the infrastructure equipment, comprising:

circuitry configured to control a transmitter and a receiver to configure radio bearers for transmitting data to or receiving data from one or more wireless communications devices, wherein the circuitry is further configured to determine, from the wireless communications network, whether or not the target infrastructure equipment is enabled to support an integrity protection scheme, and in response to the target infrastructure equipment being enabled to support the integrity protection scheme, include in a handover request message an information element directing the target infrastructure equipment to enable the integrity protection scheme for transmitting or receiving user plane data via the target infrastructure equipment, transmit from the source infrastructure equipment to the target infrastructure equipment an indication as to whether or not user plane data is being transmitted to or received from the wireless access network via the source infrastructure equipment using an integrity protection scheme, transmit to the target infrastructure equipment an indication of a configuration of a data radio bearer which has been established for receiving the user data from the wireless communications device at the source infrastructure equipment, and receive, from the target infrastructure equipment, an indication of a difference between a configuration of a radio bearer for transmitting user data to the wireless communication device from the target infrastructure equipment and a configuration of the radio bearer for transmitting the user data to the wireless communications device from the source infrastructure equipment including whether or not the integrity protection scheme of the user data is supported by the target infrastructure equipment.

2. The infrastructure equipment of claim 1, wherein the circuitry is further configured to transmit a handover request message to the target infrastructure equipment indicating a request for handing over the wireless communications device from the source infrastructure equipment to the target infrastructure equipment.

3. The infrastructure equipment of claim 1, wherein the circuitry is further configured to receive a handover command from the target infrastructure equipment indicating that the source infrastructure equipment should handover the wireless communications device to the target infrastructure equipment.

4. The infrastructure equipment of claim 3, wherein the circuitry is further configured to receive an indication as to whether or not the integrity protection scheme can be used for transmitting or receiving user plane data via the target infrastructure equipment.

5. The infrastructure equipment of claim 4, wherein the circuitry for receiving the indication as to whether or not the integrity protection scheme can be used for transmitting or receiving user plane data via the target infrastructure equipment is further configured to
   receive an indication as to whether or not the integrity protection scheme for the user plane data is supported by the target infrastructure equipment.

6. The infrastructure equipment of claim 4, wherein the handover request message includes an information element providing the indication from the source infrastructure equipment as to whether or not user plane data is being transmitted to or received from the wireless access network via the source infrastructure equipment using the integrity protection scheme.

7. The infrastructure equipment of claim 4, wherein the handover command includes an information element providing the indication as to whether or not the integrity protection scheme for the user plane data is supported by the target infrastructure equipment.

8. The infrastructure equipment of claim 4, wherein the circuitry for receiving the indication as to whether or not the integrity protection scheme can be used for transmitting or receiving user plane data via the target infrastructure equipment is further configured to
   in response to the integrity protection scheme for the user plane data not being enabled for the target infrastructure equipment and the user plane data being transmitted to or received from the source infrastructure equipment using the integrity protection scheme, receive the indication that the target infrastructure equipment is not enabled for the integrity protection of the user plane data for configuration for the wireless communications device as part of the handover.

9. The infrastructure equipment of claim 4, wherein the circuitry for receiving the indication as to whether or not the integrity protection scheme can be used for transmitting or receiving user plane data via the target infrastructure equipment is further configured to
   in response to the target infrastructure equipment not being enabled for the integrity protection of the user plane data and the user plane data being transmitted to or received from the source infrastructure equipment using the integrity protection scheme, not receive the indication that the target infrastructure equipment is not enabled for the integrity protection of the user plane data, wherein the source infrastructure equipment assumes the same configuration of the integrity protection scheme for the target infrastructure equipment as for the source infrastructure equipment.

10. The infrastructure equipment of claim 4, wherein the circuitry for receiving the indication as to whether or not the integrity protection scheme can be used for transmitting or receiving user plane data via the target infrastructure equipment is further configured to
   in response to the integrity protection scheme for the user plane data not being enabled for the target infrastructure equipment and the user plane data being transmitted to or received from the source infrastructure equipment without using an integrity protection scheme, receive the indication that the target infrastructure equipment is not enabled for the integrity protection of the user plane data for configuration for the wireless communications as part of the handover.

11. The infrastructure equipment of claim 4, wherein the circuitry for receiving the indication as to whether or not the integrity protection scheme can be used for transmitting or receiving user plane data via the target infrastructure equipment is further configured to
   in response to the target infrastructure equipment not being enabled for the integrity protection of the user plane data and the user plane data being transmitted to or received from the source infrastructure equipment without using an integrity protection scheme, not receive the indication that the target infrastructure equipment is enabled for the integrity protection of the user plane data, the source infrastructure equipment assuming the same configuration of the integrity protection scheme for the target infrastructure equipment as for the source infrastructure equipment.

12. The infrastructure equipment of claim 4, wherein the wireless communications device is configured to enable or disable the integrity protection scheme in accordance with whether or not the integrity protection scheme can be supported by the target infrastructure equipment.

13. The infrastructure equipment of claim 1, the circuitry for receiving from the target infrastructure equipment the indication as to whether or not the integrity protection scheme for the user plane data can be supported by the target infrastructure equipment is further configured to
   receive an indication of a difference between a configuration of a radio bearer for receiving the user data from the wireless communications device at the target infrastructure equipment and the configuration of the radio bearer for receiving the user data from the wireless communications device at the source infrastructure equipment.

\* \* \* \* \*